INVENTORS
PAUL E. BECKING.
JAMES D. BUNGARD.
ROY E. SHERMAN.
BY Harness, Dickey & Pierce
ATTORNEYS

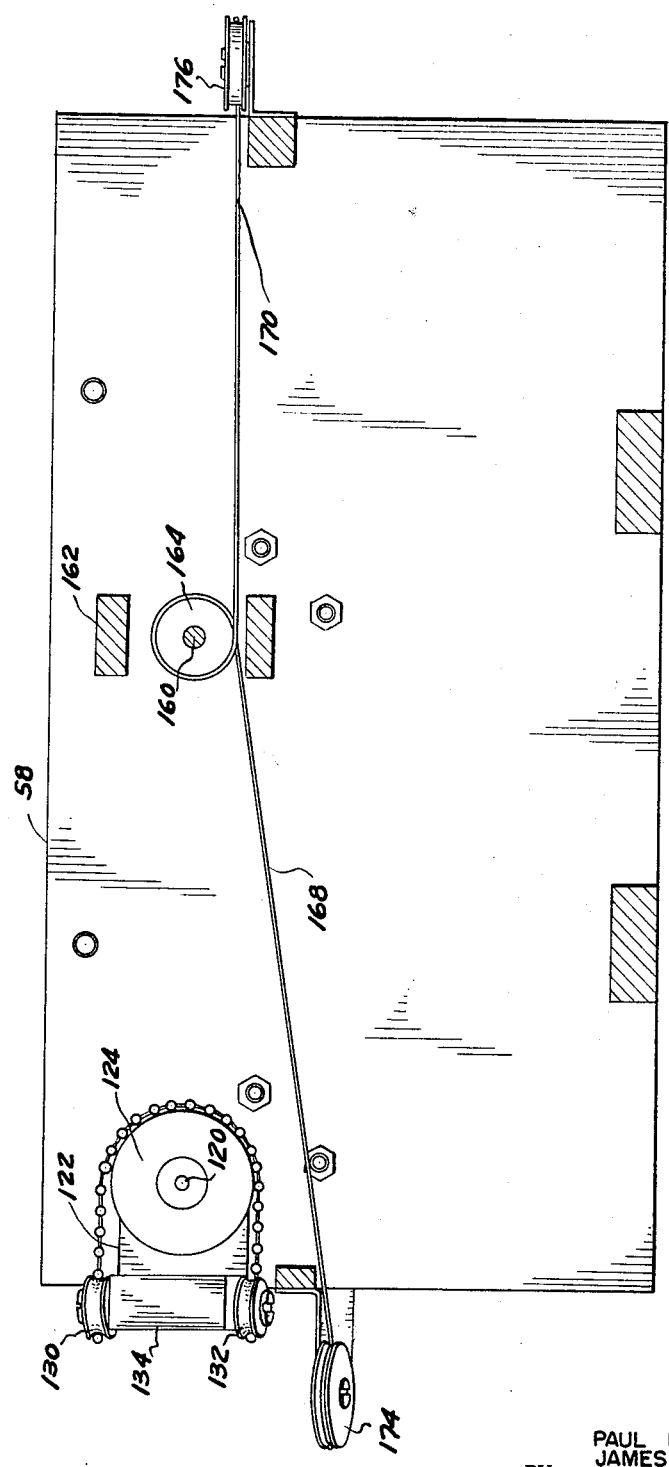

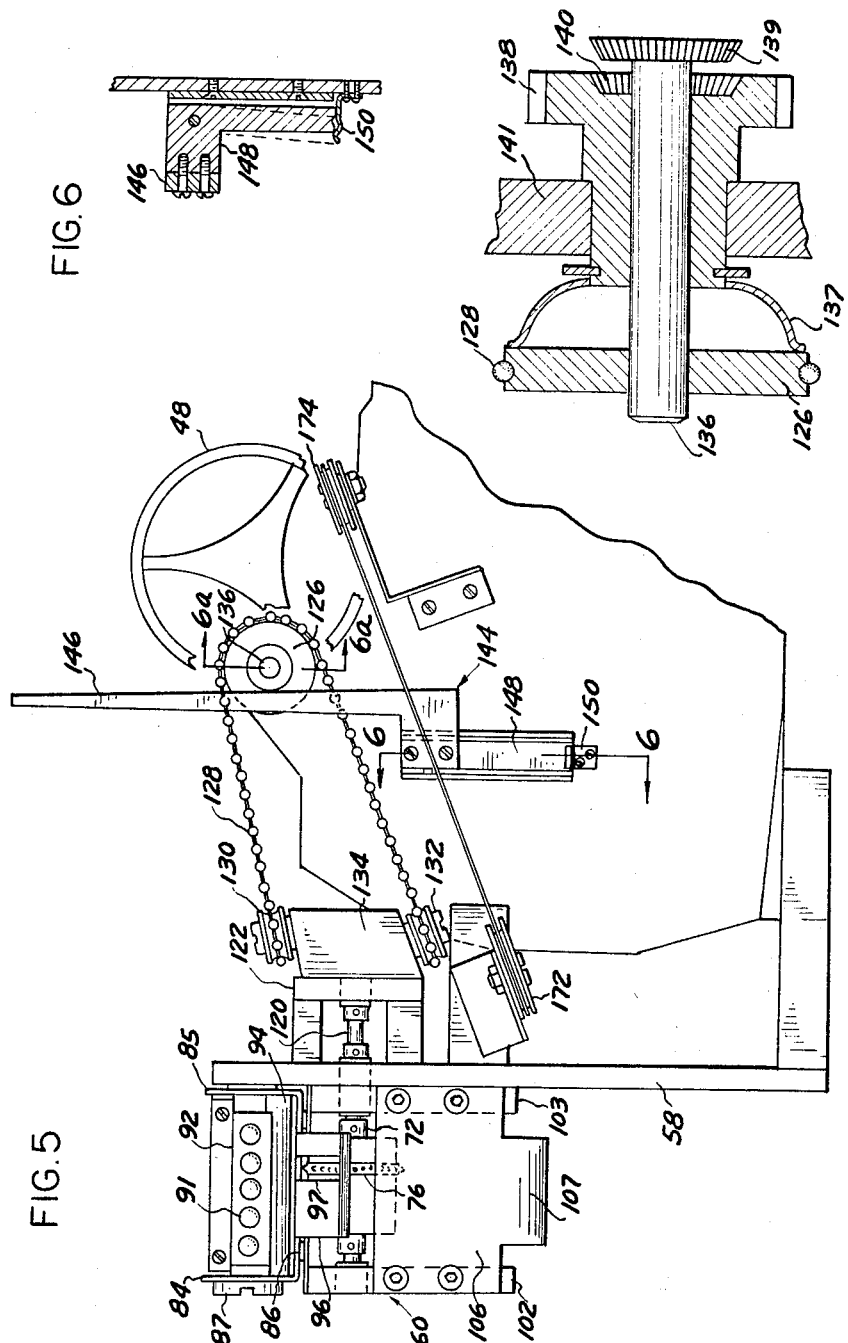

Nov. 8, 1966 P. E. BECKING ETAL 3,283,871
WRITING SYSTEM HAVING ORDINATE AND ABSCISSA READER MEANS
Filed Dec. 18, 1963 10 Sheets-Sheet 5

INVENTORS
PAUL E. BECKING.
JAMES D. BUNGARD.
ROY E. SHERMAN.
BY
Harness, Dickey & Pierce
ATTORNEYS

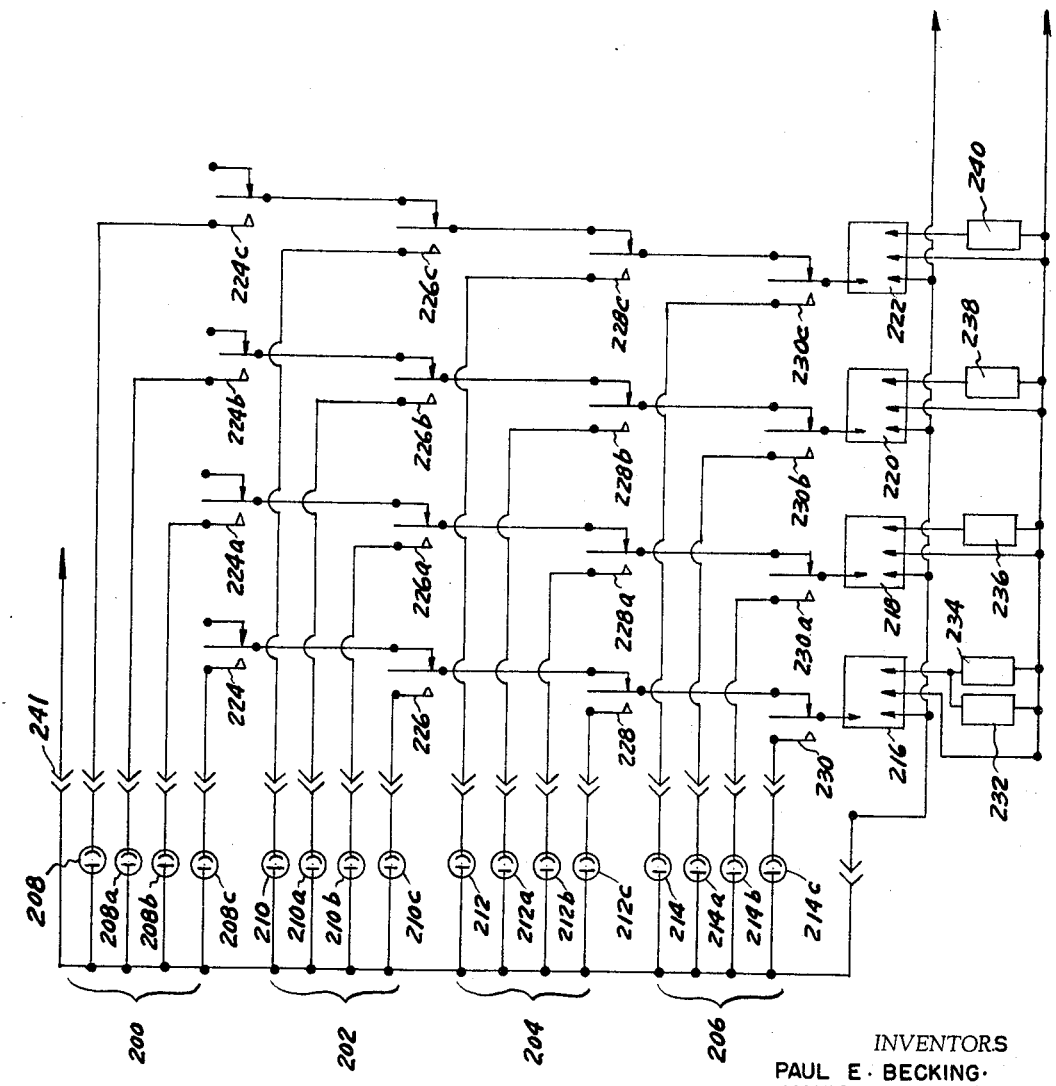

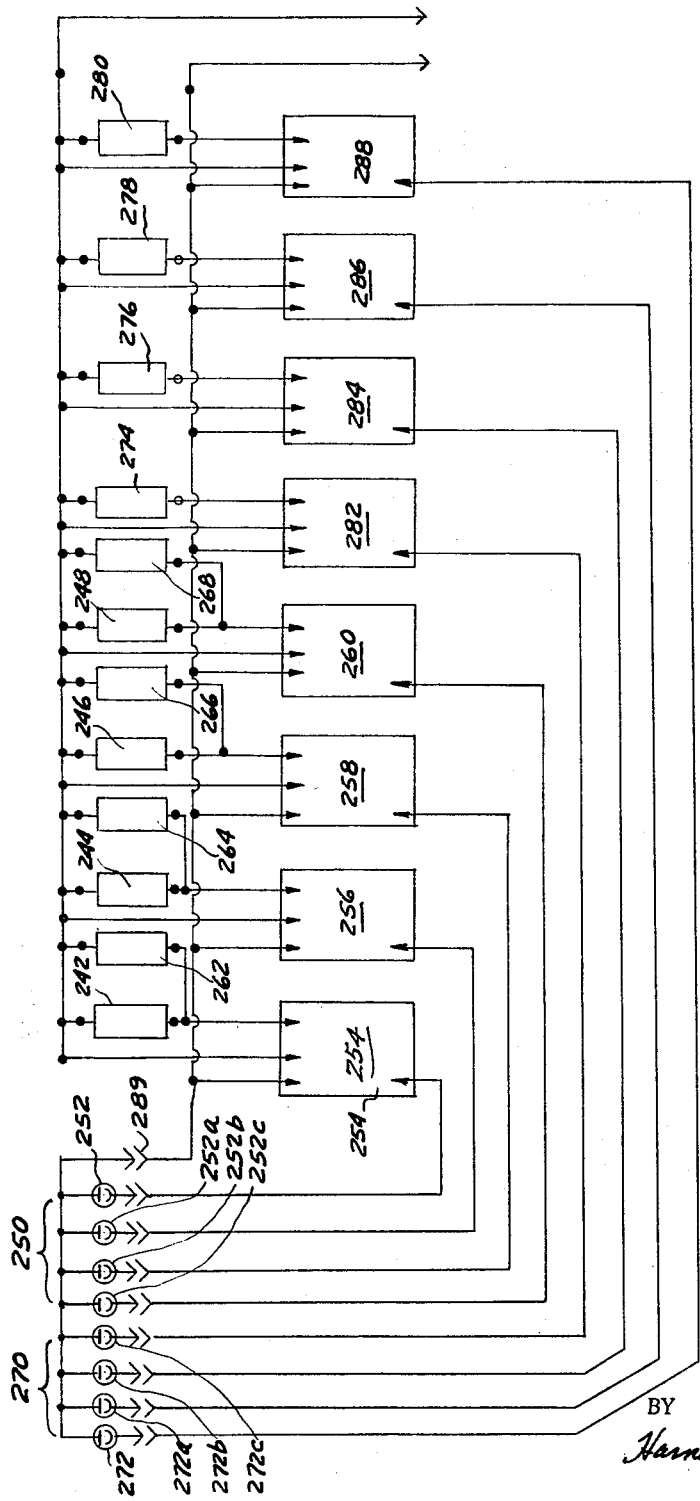

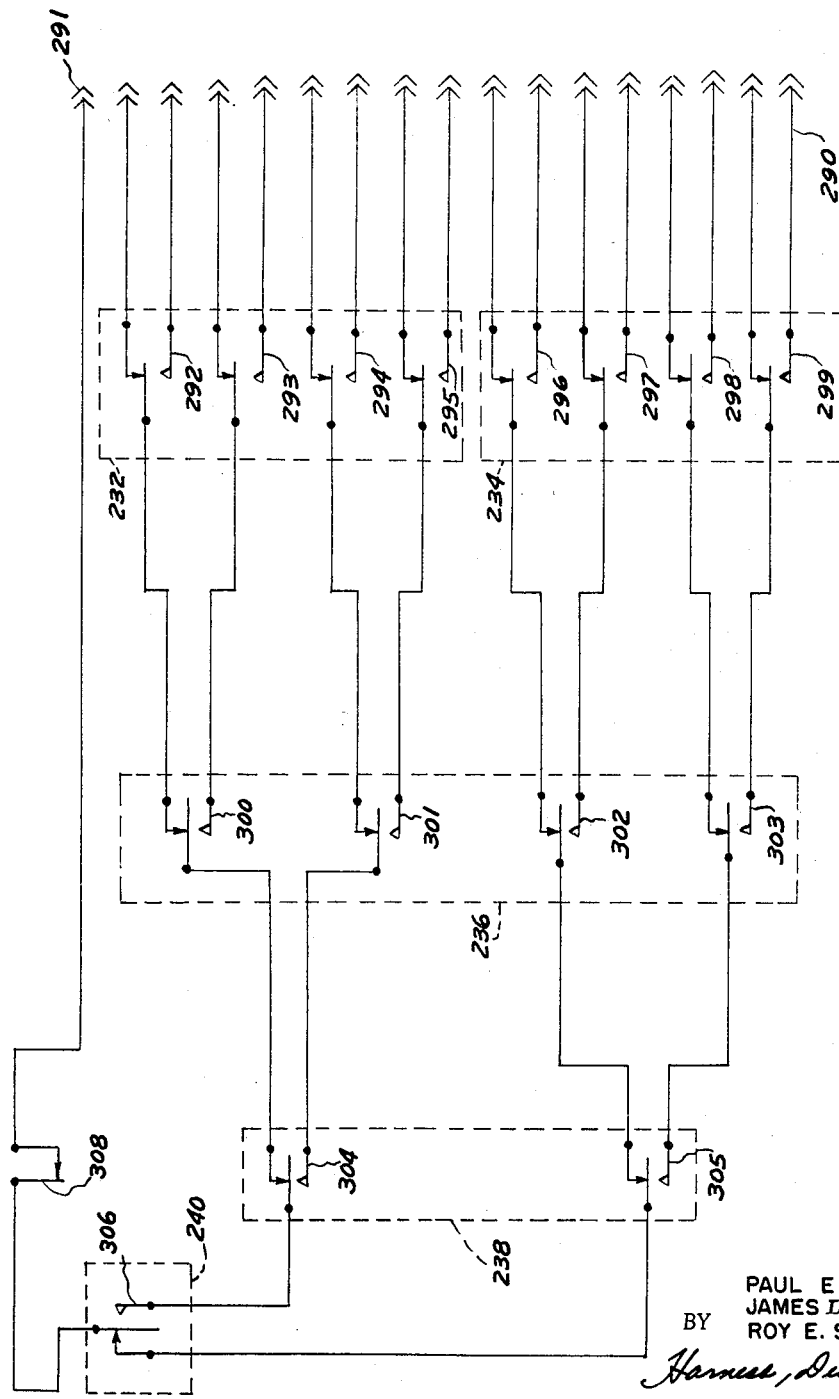

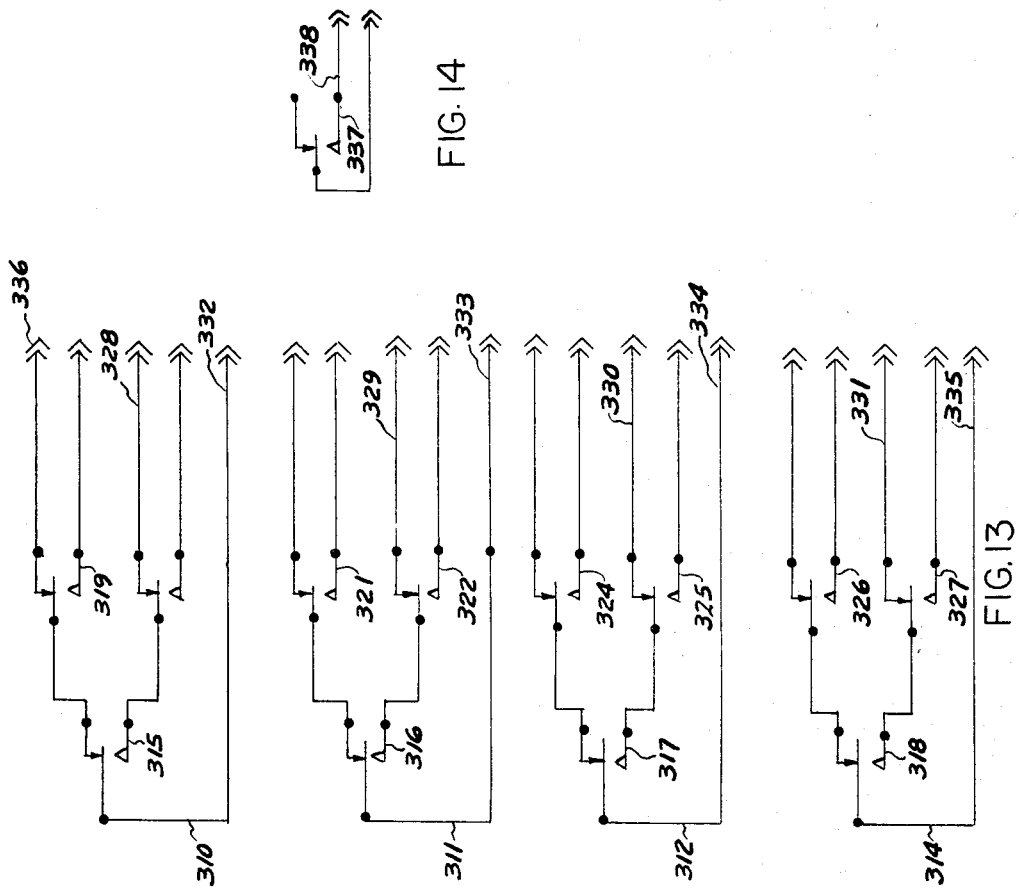

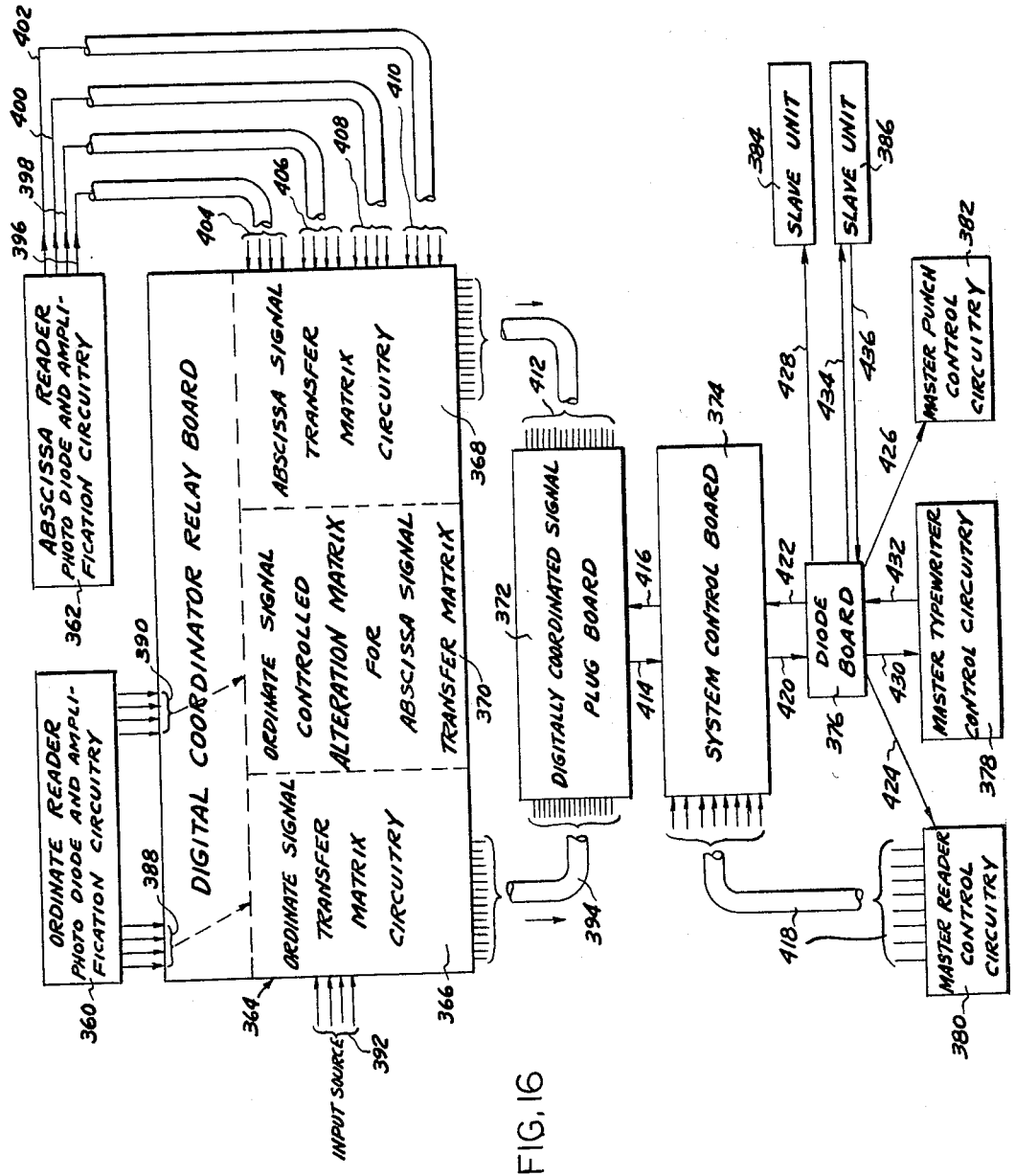

United States Patent Office 3,283,871
Patented Nov. 8, 1966

3,283,871
WRITING SYSTEM HAVING ORDINATE AND ABSCISSA READER MEANS
Paul E. Becking, Lake Orion, James D. Bungard, East Detroit, and Roy E. Sherman, Warren, Mich., assignors to Dura Corporation, Oak Park, Mich., a corporation of Michigan
Filed Dec. 18, 1963, Ser. No. 331,486
28 Claims. (Cl. 197—20)

The present invention relates in general to business machinery and control systems therefor, and more particularly to an automated writing system including a typewriter or other business machine which may be advantageously provided with digital co-ordination means responsive to certain functional operations of the typewriter such as those relating to indexing of a sheet of paper from line to line and to spacing of the print mechanism along any given line from character printing position to character printing position therealong.

The inventive principles hereinafter disclosed in detail are particularly adapted for utilization in an automated writing system such as described in commonly owned copending application Serial No. 227,767, for Writing System, filed October 2, 1962, and the disclosure of that application is specifically incorporated herein by reference. The basic components of the writing system disclosed in Serial No. 227,767 comprise: a writing unit in the form of an electrically powered typewriter; operation recording means in the form of punch means for coding a paper tape, or the like; and operation reproducing means in the form of reader means for translating information stored on a paper tape, or the like, into electrical signals, control circuitry energizable by the electrical signals, and writing unit actuating means responsive to energization of the control circuitry and connected to the writing unit to produce operation thereof in accordance with the information on the paper tape.

In general, the concept of "digital co-ordination" relates to the fact that any sheet of paper upon which characters are to be printed by a typewriter may be divided into individual printing spaces defined by spaced vertical and horizontal lines. The horizontal lines would be spaced a distance representative of the vertical movement imparted to the sheet of paper by an indexing operation of the typewriter by, for example, rotation of the typewriter platen. The vertical lines would be spaced a distance equal to the horizontal distance between adjacent printed characters which is determined, for example, by the length of the horizontal movement of the printing head of the typewriter relative to the platen during actuation of the typewriter escapement or spacing mechanism between printing operations. Each possible printing space on any sheet of paper may, therefore, be separately and distinctly designated. In the present invention, a co-ordinate system is utilized such as, for purposes of general explanation and description, a conventional X–Y co-ordinate system wherein X—X represents a horizontal axis of abscissas and Y—Y represents a vertical axis of ordinates. The horizontal co-ordinate of any point measured along the X—X axis is designated the abscissa and the vertical co-ordinate of any point measured along the Y—Y axis is designated the ordinate. In this manner, any horizontally extending line of printing spaces on the sheet of paper can be located digitally, by a reference numeral or other designation, along the Y—Y axis by the Y co-ordinate, i.e., the ordinate. Similarly, any particular space along a particular horizontal line of printing spaces can be located digitally, by a reference numeral or other designation, along the X—X axis by the X co-ordinate, i.e., the abscissa.

A general purpose of this invention is to provide a writing system having multiple control systems wherein one of the control systems is integrated with the writing system by digital co-ordination means and whereby the other control systems can be digitally co-ordinated.

A digitally co-ordinated control system may be utilized to generate control signals for particular purposes at particular times. For example, such control signals may be utilized to position a sheet of paper and locate a particular printing space in a particular manner, to cause a particular character to be printed at a particular printing space, to cause a particular group of characters to be inserted at a particular place, to cause operation of related equipment at particular times, to transfer data or information between separate systems at particular times, etc.

The inventive principles have particular utility in connection with automatic completion of printed forms having blanks on different lines and in different positions on particular lines. An object of this invention is to provide increased versatility in the programming of printed forms and in variation of formats of particular blanks to be filled in particular programs. An important feature of the subject system is the ability to produce and utilize multiple control signals at any printing space on a sheet of paper and thereby greatly increase program and format scope of printed forms. The present invention enables an automatic writing system to be programmed in accordance with the printing spaces on a form whereby certain predetermined control signals are put into or are capable of being put into the system in a particular manner and for a particular purpose at particular printing space locations.

Another general object is to provide digital co-ordination means which are directly correlated with the location of the sheet of paper in the typewriter. Thus another important feature of the subject digital co-ordination means is the ability to be continually and automatically correlated with printing head location relative to be a programmed sheet of paper so that the control system is always in phase with the printing space aligned with the printing head at any given time between the initiation of a programmed cycle of operation and the completion of the programmed cycle of operation so long as the sheet of paper remains in fixed relationship to the platen regardless of the intervening sequence of movements of the paper relative to the printing head.

It is a further object of the present invention to provide an automatic writing system having multiple control systems which are capable of functioning separately or co-operatively at any print position on a piece of paper in response to or by means of one or more signals obtained from digitally co-ordinated readers means and associated coded tape means or the like.

A more specific object of this invention is to provide digital co-ordination means for an automatic writing system, utilizing an electric typewriter or the like, which is integrated with the writing system and becomes an integral part thereof dependent upon and operable in conjunction with the electric typewriter in a manner correlating operation of digitally co-ordinated reader means with operation of the typewriter so that the digitally co-ordinated reader means are at all time functionally in step with the typewriter. That is to say, data storage means such as coded tapes are associated with the reader means to provide certain control signals for certain writing positions, i.e., at a particular printing space on a piece of paper in a typewriter. Complete synchronization in a given program requires that the same control signals be provided at the same writing position regardless of changes or interruptions in continuity of the program or in a particular format. For example, program continuity is often disrupted by the operator during automatic operation to perform some manual operation on the typewriter which may cause reverse movement of either or both of the indexing and spacing means of the typewriter.

Thus still another object of the present invention is to provide digital co-ordinating means in a writing system which are directly and positively responsive to all functional movements of a piece of paper in the typewriter caused by any of the typewriter mechanisms so that the particular code columns of the tapes associated with the digitally co-ordinated reader means have a particular relationship to the piece of paper which remains the same during a writing operation until and unless the piece of paper is physically moved relative to the typewriter without a corresponding physical movement of typewriter mechanism. In other words, the present digital co-ordinating means are adapted to have complete synchronization with the parts of the typewriter which cause indexing of a sheet of paper and also spacing movement from one printing space to the next so that synchronization is maintained until the piece of paper is released from a secured position in the typewriter on the platen. Therefore, as long as the paper is indexed in a normal manner by rotation of the platen without slippage, the synchronization between the digitally co-ordinated reader means and the tape and the functional movement incurred in the writing system will be maintained.

In this connection, a more specific object of the present invention is to provide mechanical actuating means for positively driving a program device such as a tape, or a disc or the like, in synchronization with the actual movement in the typewriter of a piece of paper caused by indexing and carriage movement, and the like, so that the machine operator cannot unwittingly cause the control system to get out of phase relative to the position of the paper once a particular program has begun. For example, in prior art program devices, when an error is made in any of the typing operations, the from or sheet of paper is usually completely destroyed because the form cannot be moved without destroying the synchronization. In the present device, the operator is capable of moving the paper forwardly or backwardly by indexing the platen without destroying the continuity of the program and the synchronization thereof. It will be readily appreciated that if some means are not provided to maintain synchronization, synchronization is destroyed whenever the operator or some other factor disrupts the normal continuity of the program. However, in the present arrangement, the operator may at any time manually index and/or space the typewriter platen without losing the continuity and machine program control synchronization.

Illustrative embodiments of the inventive principles are hereinafter described in detail by reference to the accompanying drawing in which:

FIGURE 4 is a sectional view taken along the line 4—4 in FIG. 1;

FIGURE 5 is a partial side elevational view of the apparatus shown in FIG. 1;

FIGURE 6 is a partial sectional view taken along the line 6—6 in FIG. 5;

FIGURE 6a is a partial sectional view taken along the line 6a—6a in FIG. 5;

FIGURE 10 is a diagrammatic view of a portion of the control circuitry for the apparatus shown in FIG. 1;

FIGURE 11 is a diagrammatic view of another portion of the control circuitry;

FIGURE 12 is another diagrammatic view of another portion of the control circuitry;

FIGURE 13 is another diagrammatic view of another portion of the control circuitry;

FIGURE 14 is a diagrammatic view of another portion of the control circuitry;

FIGURE 15 is a diagrammatic view of another portion of the circuitry; and

FIGURE 16 is a block diagram of an illustrative writing system incorporating the inventive principles.

Figure 1:
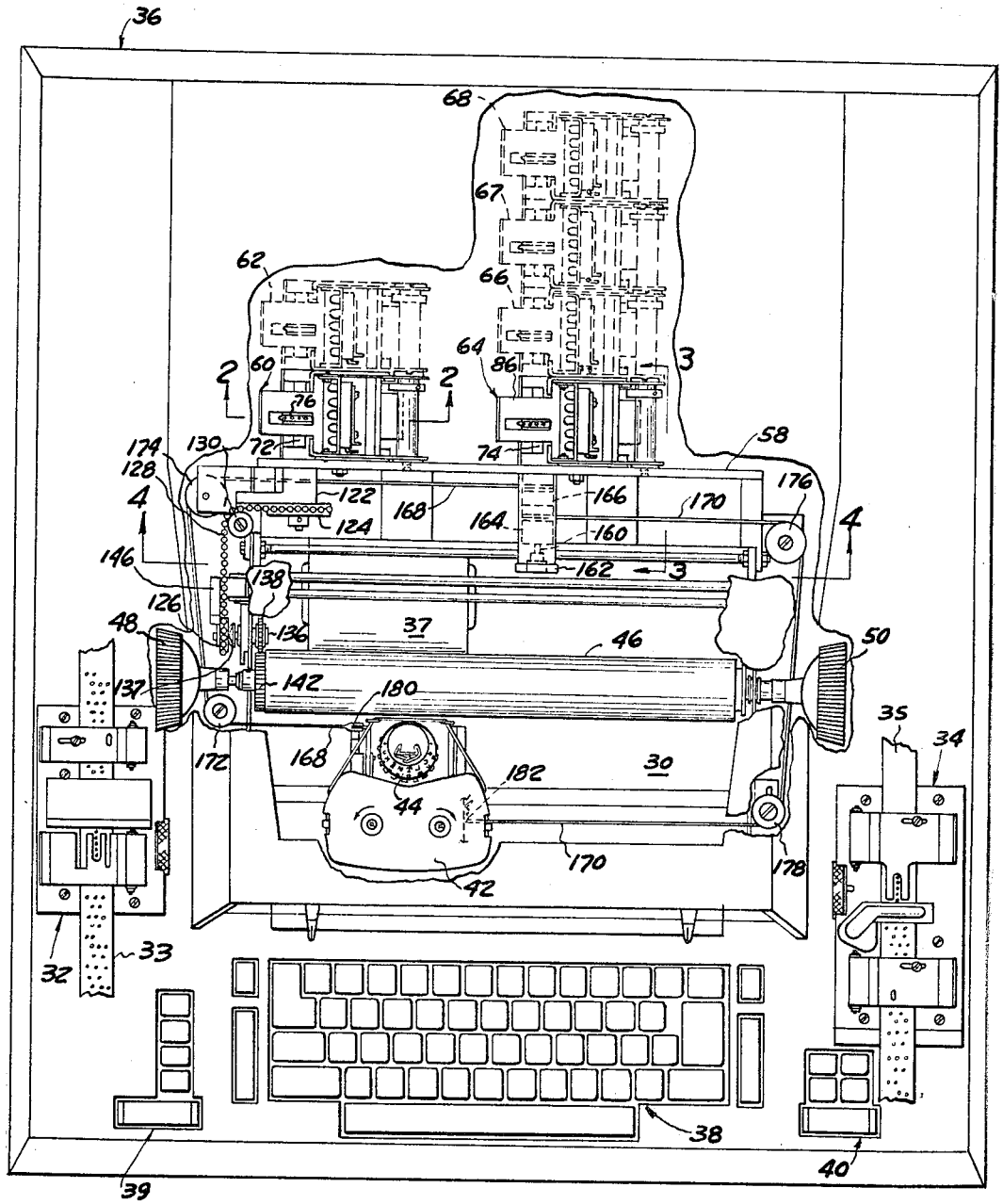
FIGURE 1 is a plan view, with portions broken away, of a writing system embodying the principles of the present invention.

Referring now to FIGURE 1, the subject digital coordination means provides information representative of a printing location. The digital coordination means is incorporated with a writing system of the type described in the aforementioned Serial No. 227,767 comprising a writing unit in the form of an electric typewriter 30, reader means 32 for controlling operation of the typewriter in accordance with electrical signals generated from a coded paper tape 33, and punch means 34 for recording operations of the typewriter by coding a paper tape 35. In addition to the digital coordination means, means is included for providing intelligence to the typewriter 30 to cause the typewriter 30 to utilize or record the intelligence. This last named means may include the reader means 32, a keyboard 38, including switches 39, 40, an auxiliary source of intelligence, etc. Further, the intelligence may operate the typewriter 30, the punch 34, or both the typewriter 30 and the punch 34. The writing system is mounted within a common casing 36 and driven by a common power source such as an electric motor 37. The typewriter keyboard 38 is located at the front of the machine along with system control switch clusters 39, 40. The reader means 32 form part of a first control system which includes means for generating electrical signals in accordance with the coded tape 33, control circuitry energizable by the electrical signals, and actuating means connected to the various typewriter operating mechanisms and being responsive to energization of the control circuitry by the electrical signals to cause selective operation the typewriter. The first control system is basically an operation reproducing system which may be utilized to repetitively duplicate a sequence of typewriter operations such as, for example, in the production of a form letter. However, the reader means 32 may also be utilized to generate electrical signals for utilization in other control systems.

The typewriter may be of conventional design and, in the illustrative embodiment, includes indexing means and spacing means to rectilinearly vary the position of a piece of paper relative to the character imprinting mechanism. The terms indexing means and spacing means are used generically to refer to any of the conventional mechanisms, or functionally equivalent devices, which may be utilized to move the paper between spaced horizontal printing lines and to obtain relative movement between the paper and the imprinting mechanism along each line between adjacent printing spaces. In the preferred embodiment, a movable carriage 42 forms part of the spacing means and movably supports a type sphere 44. The sphere 44 positions various type characters in printing position and also moves any selected character to imprinting engagement with a sheet of paper against a rotatable platen 46 forming part of the indexing means. The carriage 42 is movable along the rotatable platen in step-by-step fashion from printing space to printing space. A pair of control knobs 48, 50 are provided to manually index the platen 46 which is also automatically indexable by conventional mechanism. The details of operation of the typewriter unit are thought to be well known to those skilled in the art to which this invention relates, and the details of operation of the writing system, comprising the writing unit, the punch 34, and the reader 32, are described in detail in the aforementioned copending application and are now generally known and understood by those skilled in the art to which this invention relates.

Figure 9A:
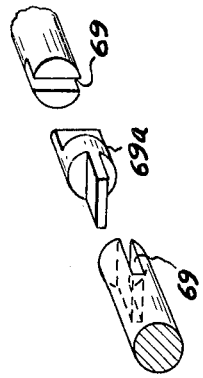
FIGURE 9a is an exploded perspective view of a portion of the apparatus shown in FIG. 8.
Figure 9:
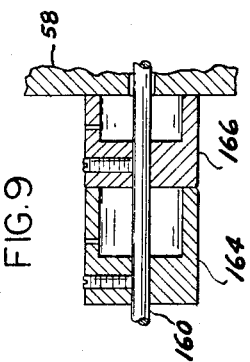
FIGURE 9 is a partial sectional view taken along the line 9—9 in FIG. 3.
Figure 8:
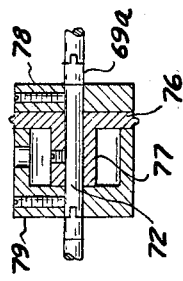
FIGURE 8 is a sectional view taken along the line 8—8 in FIG. 2.

A second control system is mounted in the common casing and located at the rear of the typewriter substantially centrally of the sides thereof on bracket means 58. The second control system includes, in the illustrative embodiment, first signal generating means in the form of one or more ordinate reader units 60, 62, etc., and second signal generating means in the form of one or more abscissa reader units 64, 66, 67, 68. The ordinate reader units are associated with the typewriter indexing means and, in effect, provide the ordinate portion of the aforedescribed digital co-ordinate reference system. The abscissa reader units are associated with the typewriter spacing means and, in effect, provide the abscissa portion of the reference system. The reader units are adapted to receive and read separate control tapes. Reader units 60, 62, etc., are provided for a common purpose and the reader units 64, 66, 67, 68, etc., are provided for a different but common purpose as will be hereinafter described in detail. Each group of signal generating means are provided with drive shaft means 72, 74 adapted to be driven by means common to all reader units of the associated group of signal generating means. The reader units are of modular construction and are adapted to be mounted in series in abutting relationship extending toward the rear of the system casing. Consequently, the number of reader units provided can be varied as desired as indicated by the reader units 62, 66, 67 and 68 which are shown in phantom. As shown in detail in FIG. 9a, the modular arrangement is facilitated by providing a drive slot means 69 in each drive shaft so that abutting reader units may be simply fastened to the adjacent side surface of the innermost reader unit and the drive shafts positively connected by drive key means 69a.

Each of the reader units are substantially identical in construction and therefore only the reader unit 60 is hereinafter described in detail. Referring now to FIGS. 1, 2, 5 and 8, the reader units each include cog wheel-type tape driving means 76, shown in detail in FIG. 8, fixedly secured to the shaft 72 by a hub portion 77, a backing plate 78, and a telescopically mounted hub 79. The cog wheel is rotatably mounted in a fixedly mounted lower portion 80 of the reader means. A swingable upwardly pivotable light supporting bracket means 81 is mounted thereabove.

Figure 2:
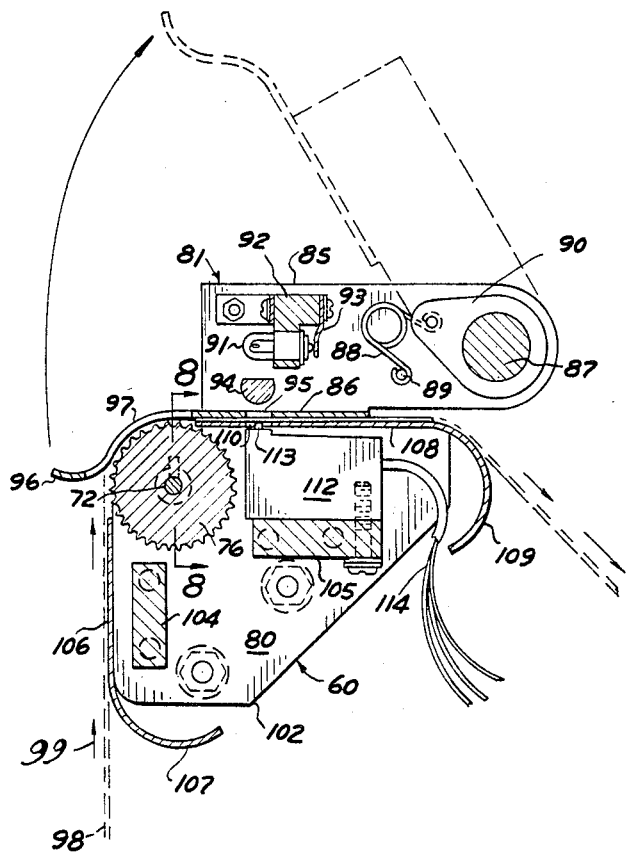
FIGURE 2 is a partial sectional view taken along the line 2—2 in FIG. 1.

The bracket means 81 comprises a channel shaped member having spaced parallel side flanges 84, 85 interconnected by a central web portion 86 as shown in FIG. 5. Referring now to FIG. 2, a pivot shaft 87 is fixedly connected to the bracket 58 and pivotally supports the ends of the side flanges. Spring means 88 are fixedly connected at one end to a rod 89 extending between the side flanges and at the other end to lever arm member 90 fixedly attached to the shaft 87. Bracket means 81 is pivotally movable between a closed position and an open position and is biased to either the closed or open position by the spring means.

Light means are mounted on the bracket means and comprise a bank of light bulbs 91 mounted in a lamp support 92 and suitably electrically connected to a power source through contact means 93, a portion of which is shown in FIG. 2. A light concentrating prism member 94 is mounted below the light bulbs to provide a continuous downwardly directed band of light in alignment with a transverse slot 95 in the web portion.

The front end 96 of the web portion is downwardly curved for location adjacent the cog wheel 76. A slot 97 is aligned with the cog wheel to enable a paper tape 98 to be wound over the cog wheel and in abutting engagement with the underside of the web portion. The paper tape is provided with a series of equally spaced drive perforations adapted to receive the cogs on the wheel and cause the tape to be driven along the underside of the web portion in the direction of the arrows 99 during continuous operation. However, it will be understood that the cog wheel is reversely rotatable and that the tape is adapted to be reversely driven thereby when necessary.

Referring again to FIG. 2, the lower portion 80 comprises spaced parallel plates 102, 103, FIG. 5, which are rigidly interconnected by cross brace members 104, 105. A downwardly extending tape guide plate 106 is mounted on the front of the plates and includes a rearwardly curved lower portion 107. A rearwardly extending tape guide plate 108 is mounted on top of the plates and terminates in a downwardly curved portion 109. A light slot 110 is formed in the plate 108 in alignment with the light slot 95 in the upper plate. The guide surfaces of plates 86 and 108 are spaced from one another to define a tape guideway. A plurality of photo diode cartridges 112 are mounted on the brace 105 with the tips 113 of the photo diodes extending upwardly through the slot 110 for surface engagement with the paper tape. It is to be understood that the number of photo diodes provided depends on the number of code channels utilized in the tape which may, conventionally, vary between 4, 6 and 8 channels. In the preferred embodiment, 8 channel tapes requiring 8 photo diode cartridges are utilized as hereinafter described in detail. Such tapes are divided transversely by 8 longitudinally extending code channels and are divided longitudinally by transversely extending successive equally spaced code columns having a width approximately equal to the width of the slots 95, 110. The tapes are coded by punching holes in the longitudinally extending code channels in any of a plurality of different combinations in each code column. The tapes are moved in step by step fashion to successively locate each code column between the slots and each photo diode generates an electrical signal whenever light passes through a code hole in the code channel in the tape in alignment with that particular photo diode. The reading operation is similar to that performed by the reader means 32. Suitable electrical conductor means 114 are provided to transmit electrical signals generated by the photo diodes.

The generic term "digital co-ordination means" is hereinafter utilized to include both the second control system generically, which may be utilized to digitally co-ordinate other control systems and other machine functions as well as actuate the typewriter and its control systems, and the digitally co-ordinated connecting means between the second control system and the typewriter which are utilized to digitally co-ordinate the control system.

Referring now to FIGS. 1, 4 and 5, the connecting or follower means between the control system shaft 72 and the indexing means of the typewriter comprises, in the preferred embodiment, a non-slip direct drive chain and sprocket type assembly. As shown in FIG. 5, shaft 72 is extended inwardly by a shaft portion 120 mounted in bracket means 122 and drivingly connected to a wheel 124 by suitable means. Another wheel 126 is mounted on the side of the typewriter in a convenient location. A ball link-type chain 128 is drivingly mounted between and supported by the two wheels 124, 126 and is supported therebetween by guide pulley means 130, 132 which are rotatably mounted in properly inclined positions on the upper and lower ends of a portion 134 of the bracket 122. Wheels 124, 126 are provided with spaced apertures and connecting slots adapted to receive the chain balls and links and prevent slippage of the chain relative to the wheels.

Referring now to FIG. 6a, wheel 126 is fixedly mounted on one end of a rotatable shaft 136. Spring means or the like 137 clutchably connects the wheel and shaft to a gear member 138 through serrated portions 139, 140. Gear member 138 is suitably rotatably mounted on fixed bushing means 141 and is drivingly connected with gear member 142 fixed to and rotatable with platen 46. Suitable clutch actuation means 144 are provided to enable the wheel 126 and shaft 136 to be selectively engaged and disengaged with the rotatable gear 138 by actuation of a manually operable lever arm 146. The lever arm is adapted to be moved into abutting engagement with the side of the wheel 126 to force the wheel and shaft inwardly against the bias of the spring 137 as shown in FIG. 6a. The lower end of the manually operable arm may be fixedly secured at one end to a rocker arm 148 pivotally movable between clutched and unclutched positions and retained in those positions by a spring 150 as shown in detail in FIG. 6.

In operation with the serrated portions 139, 140 engaged rotation of the platen 46 causes rotation of the gear 142 which drives gear 138, shaft 136, and wheel 126 resulting in corresponding movement of the chain 128 and wheel 124. Rotation of the platen 46 in either direction causes corresponding rotation of the shaft 72 and the tape drive cog wheels 76. The rotational relationship between platen 46 and the gears 138, 142 and the wheels and the chain and the cog wheel means 76 is such that rotation of the platen 46 causing one line spacing of a sheet of paper in the typewriter results in shifting of the ordinate tape or tapes in the ordinate reader unit or units 60, 62, etc., one code column.

Figure 3:
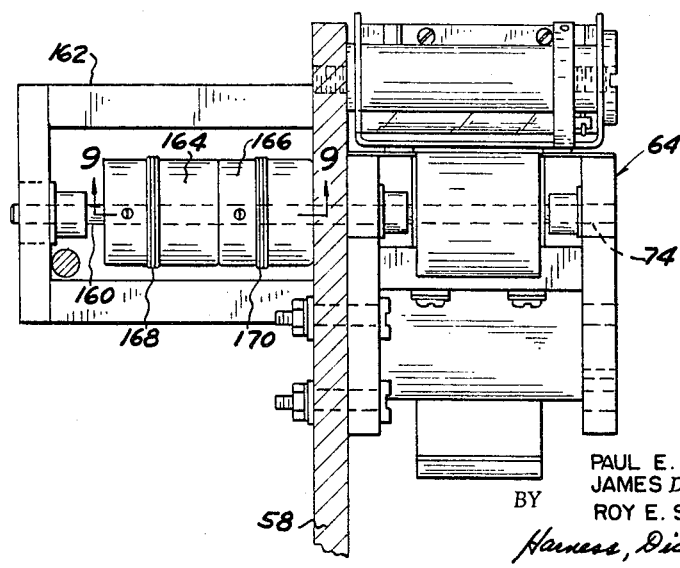
FIGURE 3 is a partial sectional view taken along the line 3—3 in FIGURE 1.
Figure 7:
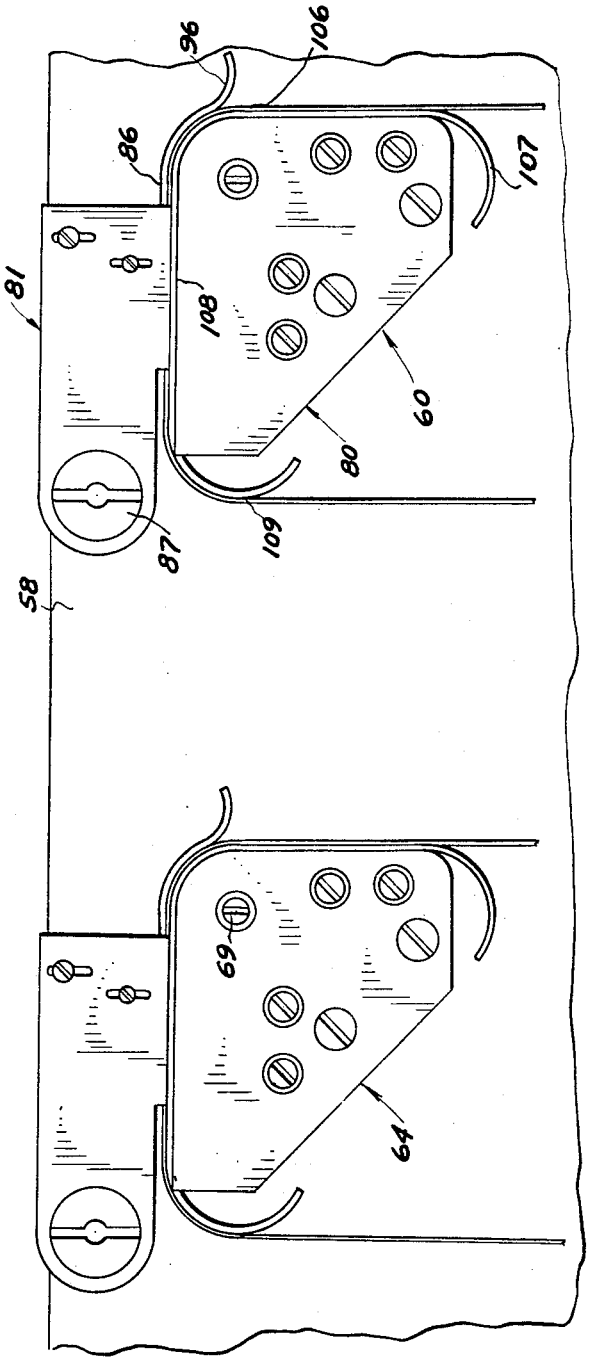
FIGURE 7 is a rear side elevational view of a portion of the apparatus shown in FIG. 1.

Referring now to FIGS. 1, 3, 4 and 5, the connecting or follower means between the control system shaft means 74 and the spacing means of the typewriter comprises a non-slip positive cable drive arrangement. As shown in FIG. 3, shaft 74 is extended inwardly by a shaft portion 160 rotatably mounted in a bracket 162. A pair of cable roll-up elements or drums 164, 166 are fixed to the shaft portion 160. Cord or cable means 168, 170 are fixedly attached at one end to the roll-up means 164, 166, respectively, and are attached at the other ends to the carriage as shown in FIG. 1. Intermediate portions of the cable are suitably supported by pulley means 172, 174 and 176, 178. The cables 168, 170 are connected to the carriage at spaced points 180, 182, located at the front and rear of the carriage, respectively, and the end portions of the cables extend parallel to the path of movement of the carriage.

The relationship of the roll-up means and the cable means and the tape drive means is such that movement of the type carriage 42 in a horizontal direction across the face of the platen 46, relative to any sheet of paper mounted thereon, causes corresponding directly related movement of the shaft 74. The relationship of the movement of the type carriage 42 relative to the cog wheel or wheels on the shaft 74 is such that movement from one printing space to the next printing space by the type carriage 42 results in movement of the associated cog wheels a distance sufficient to cause movement of the abscissa tape in the abscissa reader units one code column.

Accordingly, at any given position of a sheet of paper in the typewriter for any given format, at least one code column on one of the ordinate tapes in one of the ordinate readers, such as 60, is provided for each possible line of printable spaces. Similarly, at least one code column is provided on one of the abscissa tapes in one of the abscissa readers, such as reader 64, for each printable space across any given line of type at which a control signal is to be provided. The relationship of the tapes in the ordinate and abscissa reader means remains contant relative to the X and Y co-ordinate positions of the sheet of paper. Thus once a tape having a particular program for a related sheet of paper and the related sheet of paper are properly mounted in the machine, at any given instant when the type imprinting mechanism is aligned with a particular line of printable spaces on the paper, at least one particular code column will be in reading position in alignment with the slots in one of the ordinate readers to generate a control signal or signals. Similarly, at any given instant when the type imprinting mechanism 42 is aligned with a particular one of the printing spaces being utilized across a particular line, at least one particular code column will be in reading position in alignment with the slots in one of the abscissa readers to generate a signal or signals or combination of signals.

It may be readily appreciated, therefore, that as long as there is no relative movement between the paper and the platen, the paper in the typewriter being moved only by the functional typewriter operation mechanism manually or automatically, the digital co-ordinator system will remain completely synchronous. Thus, by the provision of a simple locating device to insure that the co-ordinator tapes and the paper acquire a particular relationship at the start of a writing operation, the typewriter operations thereafter performed will be fully co-ordinated and synchronized. Such a device may be simply a mark on each of the tapes corresponding to the beginning of a programmed operation and a mark or reference on the sheet location at which the imprinting mechanism is to be initially positioned. The abscissa tapes may be properly positioned by moving the printing mechanism to the margin position and then locating the first code columns in reading position. Thereafter, the first abscissa code column will always be in read position when the imprinting mechanism returns to the margin. For maximum setup simplicity, the first code column on the ordinate tapes may represent a starting line above the first printing line so that the type imprinting mechanism may be simply initially located anywhere on the starting line. The first code signal in the ordinate tape may be a signal, such as a carriage return signal, causing the typewriter to index and movement of the print mechanism to the margin at the beginning of the next line. Simultaneously, the ordinate tape would be moved to the next code column which represents the next line of type. In this manner, the printing mechanism is exactly positioned relative to the abscissa tape which will thereafter be properly moved as the imprinting mechanism moves along the first printing line.

The uses of the aforedescribed digital co-ordination means in business systems is virtually unlimited. Those skilled in the art to which this invention relates will be readily able to adapt the inventive principles hereinbefore disclosed for use with various control systems in various manners. For purposes of illustration, a particular application of the inventive principles is hereinafter disclosed in detail, it being understood, that while certain aspects of the particular application disclosed may in themselves be unique, the aforedescribed coordinating means are not necessarily limited to association therewith.

In the illustrative embodiment, a single 8 channel ordinate reader means 60 is provided and a pair of 8 channel abscissa reader means 64, 66 are utilized. Each of the 8 channel tapes utilized with the reader means are divided into two program portions, each program portion comprising 4 code channels. Consequently, the ordinate reader means consists of two 4 code channel programs and the abscissa reader means consists of four 4 code channel programs. Each 4 channel program provides a signal capacity of 16 separate code combinations which may be utilized to provide 16 separately defined signals. The various code combinations may be used to control both functional and printing operations in the typewriter, may be used to control either the reader mechanism 32 or the punch mechanism 34 associated with the typewriter, may be used to monitor and verify tape controlled typewriter operation, may be used to control related auxiliary typewriters, readers, and punches, and may be used to integrate diverse business machinery and transfer information between systems.

Referring now to FIGS. 10–17, illustrative control circuitry is shown for the digital co-ordination means wherein the abscissa reader means provides 4 different programs. Selection of one of the four abscissa program portions is accomplished through the ordinate reader means. The abscissa reader means is shown, in FIG. 10, to comprise four separate groups of diode banks 200, 202, 204, 206 which are mounted in the reader means 64, 66 as hereinbefore described. Control signals generated by the photo diodes 208, 210, 212, 214 are translated to amplifiers 216, 218, 220, 222 through translation means in the form of a switching matrix. The matrix includes 4 sets of selectively operable swtiches 224, 226, 228 and 230. The electrical signals generated by the diodes 208, 210, 212 and 214 are transferred through the amplifiers 216, 218, 220, 222 to cause selective energization of control means in the form of relays 232, 234, 236, 238, 240 which are energized in varying patterns depending on the code combination read by the photo diodes. The photo diodes are connected to the matrix by jack and plug means 241.

Referring now to FIG. 11, the switches 224, 226, 228 and 230 form part of relays 242, 244, 246 and 248, respectively. Energization of the relays 242, 244, 246, 248 is controlled by a 4 channel program portion 250 of an 8 channel tape in the ordinate reader means by photo diodes 252 through suitable circuitry including amplifiers 254, 256, 258 and 260. Relays 262, 264, 266 and 268 are also energized by the photo diodes 252. The second 4 channel program portion 270 causes selective energization of diodes 272 which are connected to control relays 274, 276, 278, 280 through amplifier means 282, 284, 286, 288. The photo diodes may be connected in circuit by jack and plug means 289.

Referring now to FIG. 12, energization of relays 232, 234, 236, 238, 240 control a transfer tree matrix having 16 outputs 290 from the input 291. Relay 232 controls four of the transfer tree switches 292, 293, 294, 295 and relay 234 controls transfer tree switches 296, 297, 298, 299. Relay 236 controls transfer tree switches 300, 301, 302 and 303. Relay 238 controls transfer tree switches 304 and 305. Relay 240 controls transfer tree switch 306. A line switch 308 controllable by relay 274 of the ordinate reader means may be provided to prevent inadvertent energization of the abscissa transfer tree during carriage return or indexing operations of the typewriter.

In the illustrative embodiment, translation means for providing output signals in accordance with the coded tape are provided for each of the photo diodes 272 as shown in FIG. 13. Transfer trees 310, 311, 312, 314 comprise a first set of switches 315, 316, 317, 318 controlled by one relay 276, a second set of switches 319, 320, 321, 322 controlled by a second relay 278, and a third set of switches 324, 325, 326, 327 controlled by another relay 280. Each of the transfer trees therefore provide four signal outputs 328, 329, 330, 331 from the input lines 332, 333, 334, 335 which are connectible to the other circuitry through jack-plug means 336. The versatility of the system can be increased by eliminating the separate transfer trees and connecting each input and output to a plug board whereby a more complex tree may be built if desired or the switches may be used to modify the abscissa program.

Referring now to FIG. 14, one of the ordinate relays 274 is adapted to actuate a switch 337 which provides a single control signal on conductor 338 for causing indexing movement of the typewriter.

A light panel circuit is shown in FIG. 15 and includes a plurality of lights 340, 341, 342, 343, 344 provided to indicate which of the code channel programs are being utilized and to indicate when a digital co-ordinating mechanism is functioning. The lights 340, 341, 342, 343 are energizable by actuation of switches 345, 346, 347 and 348 by the relays 262, 264, 266, 268, respectively. Similarly, an operation light 344 is adapted to be energized by actuation of switches 349, 350, 351, 352 by the relays 262, 264, 266 and 268. The operation light is energized when all the code channels are perforated which indicates the first line of the ordinate tape so that the operator is able to determine when the ordinate tape is positioned at the beginning of a program and can properly align the form in the typewriter. Jack-plug connection means 269 may be utilized to connect the lights to the associated control circuitry.

The outputs of the various transfer trees are connectible through a conventional plug board, or the like, to the various circuits and apparatus to be controlled. The manner of connecting the digital co-ordinator outputs which supply control signals through the transfer matrixes associated therewith depends primarily upon the control program to be effectuated and the program approach used for a particular application or in particular situations. In general, the digital co-ordinator outputs will be connected in the writing unit control circuitry to obtain actuation of the writing unit typewriter, the writing unit reader means, or the writing unit punch by energization of associated solenoids which are operatively associated with the writing unit typewriter functional and operating mechanisms, the writing unit reader mechanism, and the writing unit punch mechanism.

Referring now to FIG. 16, an illustrative control system is shown schematically. The digital co-ordination means includes an ordinate reader means 360; an abscissa reader means 362; a relay board 364 which may be in the form of a printed circuit board having individual self-contained relay units plugged into associated relay circuits thereon and including the ordinate signal transfer matrix circuitry 366, the abscissa signal matrix circuitry 368, and the alteration matrix circuitry 370; plug board means 372 having input and output jack means, a system control board 374 which may also be in the form of a printed circuit board having the system controls, such as self-contained relay units, mounted thereon and input and output signal jack means to variously associate the system components; diode board means 376 having the various circuit diodes mounted thereon; a master writing unit including a master typewriter 378; a master reader 380, and a master punch 382; and one or more slave units 384, 386.

An eight channel tape is utilized by the ordinate reader means and is divided into 2 four channel programs each providing 4 signal outputs as indicated generally at 388, 390. The outputs 388 are connected to relays on the relay board which control the ordinate signal transfer matrix circuitry 366. The outputs 390 are connected to relays on the relay board which control the alteration matrix 370. Circuitry 366 provides a transfer tree comprising four inputs, indicated at 392, and sixteen outputs, indicated generally at 394, which are suitably connected to the plug board 372.

A pair of eight channel tapes are utilized by the abscissa reader means 362 and are divided into 4 four channel programs 396, 398, 400, 402 each providing 4 signal outputs as indicated at 404, 406, 408, 410. The outputs are selectively connectible to the abscissa signal transfer matrix circuitry 368 by the condition of the alteration matrix 370. Circuitry 368 provides a transfer tree for each set of 4 program signal inputs having 16 possible outputs, indicated generally at 412, which are suitably connected to the plug board 372.

The system control board 374 may be suitably connected to the plug board 372 by circuit means 414, 416. In the illustrative embodiment, master reader 380 utilizes an eight channel tape and the 8 output signals provided thereby may be transferred either to the plug board 372 are directly to the system control board 374 by suitable means indicated generally at 418. The various system components may be connected to the system control board through the common diode board 376 by circuit means 420, 422. Circuit means 424 may be provided to send control signals to the master reader 380, circuit means 426 may be provided to send control signals to the master punch 382, and circuit means 428 may be provided to send control signals to one or more slave units 384. In addition, circuit means 430, 432 are provided to send control signals to and receive control signals from the master typewriter 378; and circuit means 434, 436 are provided to send control signals and receive control signals from one or more slave units 386.

The illustrative embodiments of the inventive principles herein described may be variously modified and incorporated in alternative systems and certain details of construction of the digital co-ordination means may be variously changed without departing from the intended scope of the invention as defined by the appended claims.

What is claimed is:

1. A programming device for a typewriter or the like comprising: means for providing information representative of a printing location including ordinate reader means, abscissa reader means, and digital coordinating means synchronously connecting each of said reader means to said typewriter; and additional means for providing intelligence to the typewriter or the like to cause the typewriter or the like to record or utilize said intelligence.

2. A programming device for a typewriter or the like comprising: means for providing information representative of a printing location including a plurality of reader means, drive shaft means for said reader means to drive a coded tape means or the like through the reader means in step by step fashion from code column to code column on said tape means, and digital coordination means operatively connected to said drive shaft means to cause step by step movement of said tape means through said reader means in accordance with step by step movement between said typewriter and a sheet of paper mounted therein during a writing operation, and additional means for providing intelligence to the typewriter or the like to cause the typewriter or the like to record or utilize said intelligence.

3. A programming device for a typewriter or the like comprising first ordinate reader means having tape drive shaft means, first wheel means drivingly connected to said tape drive shaft means of said first reader means, second wheel means connected to the indexing mechanism of said typewriter and being directly rotatable thereby, drive means connected between said first wheel means and said second wheel means to cause movement of the tape drive shaft means of said first reader means corresponding to movement of said indexing means, second abscissa reader means having tape drive shaft means, third wheel means drivingly connected to said tape drive shaft means of said second reader means, and means drivingly connected between said third wheel means and the spacing mechanism of said typewriter, said third wheel means being directly rotatable by said spacing mechanism to cause movement of said tape drive shaft means of said second reader means corresponding to movement of said spacing means.

4. The invention as defined in claim 3 and having clutch means to enable said indexing means to be selectively connected and disconnected from said ordinate reader means.

5. The invention as defined in claim 3 and wherein said reader means each comprise a light source mounted on one side of the path of movement of the associated tape means and a plurality of photo diode means mounted on the other side of the path of movement of the associated tape means whereby a particular ordinate and abscissa pattern of energization of the photo diode means is provided for each possible printable space on a sheet of paper mounted in the typewriter for a writing operation.

6. The invention as defined in claim 5 and wherein each set of photo diode means for said abscissa reader means are divided into a plurality of individually selectable separate program groups whereby a plurality of distinct control signal patterns may be provided at each possible printable space.

7. The invention as defined in claim 3 and having photo diode means, electrical signal generating means associated with each of said reader means to provide coded input signals, a common output signal source, and a transfer matrix for translating said coded input signals to said common output signal source in varying patterns.

8. The invention as defined in claim 3 and having a plurality of selectable signal programs provided by input signals generated by said abscissa reader means, common output signal means for said selectable signal programs, transfer matrix means for selectively translating said input signals from said abscissa reader means to said common output signal source, and matrix control means operable in response to signals generated by said ordinate reader means for selectively conditioning said transfer matrix to transfer a predetermined signal program at each possible typing position on a sheet of paper mounted in said typewriter for a writing operation.

9. A programming device for a typewriter or the like having indexing means for causing movement between lines on a sheet of paper subject to a writing operation and spacing means for causing movement between printing spaces along each line comprising: means for providing information representative of a printing location, said last mentioned means including first reader means for coded tape means or the like, second reader means for another coded tape means or the like, each of said reader means having drive means for moving coded tape means through the reader means from code column to code column in step by step fashion, and actuating means for said drive means causing synchronous movement of said drive means relative to said indexing means and said spacing means whereby a separate code column on one of said tape means is provided for each line and a separate code column on another of said tape means is provided for each printing space; and additional means for providing intelligence to the typewriter or the like to cause the typewriter or the like to record or utilize said intelligence.

10. In combination in a writing system, an electric typewriter having indexing means and spacing means for variously locating the type imprinting mechanism relative to a sheet of paper from line to line and space to space along each line, reader means for providing intelligence representative of material to be recorded or utilized and causing automatic operation of said type imprinting mechanism, punch means for recording operations of said electrical typewriter, and a digital coordination control means including an ordinate and abscissa reader means for providing one or more control signals at each space along each line, said ordinate and abscissa reader means providing additional intelligence representative of a desired location of the type imprinting mechanism and synchronous drive mechanism for simultaneously actuating said electric typewriter, said reader means, said punch means, and said digial coordination control means.

11. In a writing system, writing means operable on spaced lines on a sheet of paper and from space to space along said lines, means for providing intelligence representative of material to be recorded or utilized to said writing means, means responsive to the positioning of said writing means including separate control signal generating means for each of said spaced lines, another separate control signal generating means for each space along said lines, both of said control signal generating means providing intelligence representative of the position of said writing means at printing spaces on the sheet of paper and digital coordination means connecting said writing means and each of said control signal generating means to maintain a predetermined relationship between said writing means and each of said control signal generating means and between each of said control signal generating means throughout operation of said writing means.

12. An automatic writing system comprising an electric typewriter having movable indexing means and spacing means, and additional means for providing intelligence signals representative of material to be recorded or utilized by the typewriter, control means for automatically operating said writing system in response to a plurality of pairs of electrical signals, one of each of said signal pairs being generated in accordance with the position of said indexing means and the other of said signal pairs being generated in accordance with the position of said spacing means, a plurality of coded tape means, a plurality of reader means having at least one of said coded tape means associated therewith for reading said coded tape means and generating pairs of electrical signals, mechanical means for causing relative movement between said tape means and said reader means, and digital coordination means operatively connecting said mechanical means to said indexing means and said spacing means and synchronizing movement of said tape means relative to said reader means with movement of a form in said typewriter caused by said indexing means and said spacing means.

13. An automatic writing system comprising a writing unit having printing means including means for supplying intelligence signals representative of material to be recorded or utilized, and indexing means and spacing means for variously locating printing spaces on a sheet of paper to be printed relative to the printing means, actuating means for operating said writing unit, control means for said actuating means responsive to electrically generated signals, a first manually operable control system for generating electric signals to manually operate said writing unit, a second automatically operable control system for generating electric signals to automatically operate said writing unit, and at least one other control system including digital coordinating control means having ordinate tape reader means and abscissa tape reader means mechanically synchronized with said indexing means and said spacing means and effective to provide control signals at any writing space on the sheet of paper.

14. In an automatic writing system having an automatic typewriter for printing characters on a sheet of paper, means for providing intelligence signals representative of material to be recorded, indexing means for said typewriter for moving between a plurality of printing lines, spacing means for said typewriter for moving between a plurality of printing spaces along said printing lines, tape means having spaced coded areas corresponddigital coordinating control means including ordinate ing to said print lines and to said printing spaces, and reader means and abscissa reader means for providing additional intelligence signals representative of indexing and spacing positions, said digital coordinating control means mechanically connecting said indexing means and said spacing means to said tape means to maintain a predetermined relationship between said spaced coded areas and said printing lines and said printing spaces during operation of said spacing means and said indexing means for producing digitally coordinated signals in accordance with the movement of said indexing means and said spacing means.

15. The invention as defined in claim 14 and wherein said tape means comprises a first code tape means having spaced code areas corresponding to said printing lines and a second code tape means having spaced code areas corresponding to said printing spaces.

16. The invention as defined in claim 15 and wherein said digital coordinating control means comprises first tape moving means operably connected to said indexing means and operatively connected to said first code tape means, and second tape moving means operably connected to said spacing means and operatively connected to said second code tape means.

17. The invention as defined in claim 16 and having multiple signal generating means operable at each of said printing lines and at each of said printing spaces to perform multiple separate and distinct operations.

18. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, means for providing additional intelligence signals representative of particular printing positions, including ordinate reader means, abscissa reader means, said ordinate reader means and abscissa reader means providing control signals at any chosen printing space on a sheet of paper mounted in said typewriter, and programming means including said ordinate and abscissa reader means digitally coordinate the automatic operation of the typewriter in response to the movement of said indexing means and said spacing means.

19. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including means to provide additional intelligence signals representative of particular printing positions said last mentioned means including ordinate reader means, abscissa reader means, drive means associated with each of said reader means to cause step by step movement of separate coded tape means through each of said reader means, a first control means for the drive means associated with said ordinate reader means being responsive to the indexing operations of said typewriter and causing corresponding step by step movement of code columns on the associated tape means relative to said ordinate reader means for each indexing movement of said typewriter, and a second control means for the drive means associated with said abscissa reader means being responsive to the spacing operations of said typewriter and causing corresponding step by step movement of code columns on the associated tape means relative to said abscissa reader means for each spacing movement of said typewriter.

20. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including means to provide additional intelligence signals representative of particular printing positions, said last mentioned means including first reader means having tape drive shaft means, first means in direct driving connection to said tape shaft means of said first reader means, second means in driving connection to the indexing mechanism of said typewriter and being directly rotatable thereby, second reader means having tape drive shaft means, third means in direct driving connection to said tape drive shaft means of said second reader means and means drivingly connected between said third means and the spacing mechanism of said typewriter.

21. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including means to provide additional intelligence signals representative of particular printing positions, said last mentioned means including first reader means for reading information in a coded tape means, second reader means for reading information in another coded tape means, each of said reader means having drive means for moving the coded tape means through the reader means from code column to code column in step by step fashion, and actuating means for said drive means causing synchronous movement of said drive means relative to said indexing means and said spacing means whereby a separate code column on one of said tape means is provided for each line and a separate code column on another of said tape means is provided for each printing space.

22. In an automatic writing system, an automatic typewriter having means for printing characters on a sheet of paper, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including ordinate reader means having a code column for each line of type, a plurality of abscissa reader means having code columns for each printing space, a first electrical control circuit energizable by said ordinate reader means, a second electrical control circuit energizable by said abscissa reader means, a transfer matrix selectively connecting said plurality of abscissa reader means to said second electrical control circuit, and said first electrical control circuit being controllably connected to said transfer matrix to enable electrical signals generated in said ordinate reader means to be used to select one of said abscissa reader means.

23. In an automatic writing system, an automatic typewriter having means for printing characters on a sheet of paper, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including first reader means for reading information in a coded tape means, second reader means for reading information in another coded tape means, each of said reader means having drive means for moving the coded tape means through the reader means from code column to code column in step by step fashion, actuating means for said drive means causing synchronous movement of said drive means relative to said indexing means and said spacing means whereby a separate code column on one of said tape means is provided for each line and a separate code column on another of said tape means is provided for each printing space, said drive means comprising gear means operable by said indexing means, first chain wheel means rotatable by said gear means, second chain wheel means rotatably connected to the drive means of said ordinate reader means, and chain means providing a positive direct drive between said first chain wheel means and said second chain wheel means.

24. In an automatic writing system, an automatic typewriter having means for printing characters on a sheet of paper, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including first reader means for reading information in a coded tape means, second reader means for reading information in another coded tape means, each of said reader means having drive means for moving the coded tape means through the reader means from code column to code column in step by step fashion, actuating means for said drive means causing synchronous movement of said drive means relative to said indexing means and said spacing means whereby a separate code column on one of said tape means is provided for each line and a separate code column on another of said tape means is provided for each printing space, said drive means comprising gear means operable by said indexing means, first chain wheel means rotatable by said gear means, second chain wheel means rotatably connected to the drive means of said ordinate reader means, chain means providing a positive direct drive between said first chain wheel means and said second chain wheel means, and clutch means to enable said indexing means to be selectively connected and disconnected from said ordinate reader means.

25. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including means to provide additional intelligence signals representative of particular printing positions, said last mentioned means including first reader means for reading information in a coded tape means, second reader means for reading information in another coded tape means, each of said reader means having drive means for moving the coded tape means through the reader means from code column to code column in step by step fashion, and actuating means for said drive means causing synchronous movement of said drive means relative to separate dexing means and said spacing means whereby a separate code column on one of said tape means is provided for each line and a separate code column on another of said tape means is provided for each printing space, said reader means each comprising a light source mounted on one side of the path of movement of the associated tape means and a plurality of photo diode means mounted on the other side of the path of movement of the associated tape means whereby a particular ordinate and abscissa pattern of energization of the photo diode means is provided for each possible printable space on a sheet of paper mounted in the typewriter for a writing operation.

26. In an automatic writing system, an automatic typewriter having means for printing characters on a sheet of paper, means for providing intelligence signals representative of said characters, indexing means in said typewriter for moving between a plurality of printing lines, spacing means in said typewriter for moving between a plurality of printing spaces along each of said printing lines, and programming means for the writing system to digitally coordinate the automatic operation of the typewriter in response to the movement of said indexing means and said spacing means including means to provide additional intelligence signals representative of particular printing positions, said last mentioned means including first reader means for reading information in a coded tape means, second reader means for reading information in another coded tape means, each of said reader means having drive means for moving the coded means through the reader means from code column to code column in step by step fashion, and actuating means for said drive means causing synchronous movement of said drive means relative to said indexing means and said spacing means whereby a separate code column on one of said tape means is provided for each line and a separate code column on another of said tape means is provided for each printing space, said reader means each comprising a light source mounted on one side of the path of movement of the associated tape means and a plurality of photo diode means mounted on the other side of the path of movement of the associated tape means whereby a particular ordinate and abscissa pattern of energization of the photo diode means is provided for each possible printable space on a sheet of paper mounted in the typewriter for a writing operation, each set of photo diode means for said abscissa reader means being divided into a plurality of individually selectable separate program groups whereby a plurality of distinct control signal patterns may be provided at each possible printable space.

27. A programming means for a writing system including a typewriter having means for providing intelligence to the typewriter representative of material to be recorded or utilized, said programming means acting to digitally coordinate the automatic operation of the typewriter in response to the movement of the indexing means and the spacing means of the typewriter including first reader means having tape drive shaft means, first means in direct driving connection to said tape shaft means of said first reader means, second means in driving connection to the indexing mechanism of said typewriter and being directly rotatable thereby, second reader means having tape drive shaft means, third means in direct driving connection to said tape drive shaft means of said second reader means, and means drivingly connected between said third means and the spacing mechanism of said typewriter, said first and second reader means providing intelligence representative of particular printing positions.

28. A programming device for a writing system including means for providing intelligence representative of material to be recorded or utilized to the writing system, said programming device acting to digitally coordinate the automatic operation of the typewriter in response to the movement of the indexing means and the spacing means including first reader means for reading information in a coded tape means, second reader means for reading information in coded tape means, another said reader means providing additional intelligence representative of movement of the indexing means and the spacing means, each of said reader means having drive means for moving the coded tape means through the reader means from code column to code column in step by step fashion, and actuating means for said drive means causing synchronous movement of said drive means relative to the indexing means and the spacing means whereby a separate code column on one of said tape means is provided for each line and a separate code column on another of said tape means is provided for each printing space, said reader means each comprising a light source mounted on one side of the path of movement of the associated tape means and a plurality of photo diode means mounted on the other side of the path of movement of the associated tape means whereby a particular ordinate and abscissa pattern of energization of the photo diode means is provided for each possible printable space on a sheet of paper mounted in the typewriter for a writing operation, each set of photo diode means for said abscissa reader means being divided into a plurality of individually selectable separate program groups whereby a plurality of distinct control signal patterns may be provided at each possible printable space.

References Cited by the Examiner
UNITED STATES PATENTS

| | | | |
|---|---|---|---|
| 2,700,446 | 1/1955 | Bladgett | 197—20 |
| 2,800,539 | 7/1957 | Edminster et al. | 197—20 X |
| 2,813,480 | 11/1957 | Fowler | 197—20 X |
| 2,884,852 | 5/1959 | Saltz | 197—133 X |
| 2,859,851 | 11/1958 | Tholstrup et al. | 197—20 |
| 2,860,758 | 11/1958 | Rhodes et al. | 197—133 |
| 2,884,852 | 5/1959 | Saltz | 197—133 X |
| 2,905,299 | 9/1959 | Hildebrandt | 197—20 |
| 3,020,996 | 2/1962 | D'onofrio | 197—133 |
| 3,063,537 | 11/1962 | Allen | 197—19 |
| 3,114,491 | 12/1963 | Wright | 197—133 X |

ROBERT E. PULFREY, *Primary Examiner.*

E. S. BURR, *Assistant Examiner.*

UNITED STATES PATENT OFFICE
CERTIFICATE OF CORRECTION

Patent No. 3,283,871                                November 8, 1966

Paul E. Becking et al.

It is hereby certified that error appears in the above numbered patent requiring correction and that the said Letters Patent should read as corrected below.

Column 1, line 63, for "manner." read -- manner, --; column 2, line 37, strike out "be"; line 52, for "readers" read -- reader --; same column 2, line 62, for "time" read -- times --; column 4, line 46, after "operation" insert -- of --; column 6, line 9, for "parallet" read -- parallel --; column 13, lines 42 and 43, for "digital coordinating control means including ordinate ing to said print lines and to said printing spaces, and" read -- ing to said print lines and to said printing spaces, and digital coordinating control means including ordinate --; column 14, line 10, after "means" insert -- to --; column 16, lines 37 and 38, for "separate dexing" read -- said indexing --; line 66, after "coded" insert -- tape --; column 17, line 38, after "means" strike out "another" and insert the same after "in", same line 38, same column 17; column 18, line 29, for "2,884,852 5/59 Saltz 197-133X" read -- 2,842,248 7/58 Saltz et al 197/133 --.

Signed and sealed this 29th day of August 1967.

(SEAL)
Attest:

ERNEST W. SWIDER                                  EDWARD J. BRENNER
Attesting Officer                                   Commissioner of Patents

Disclaimer 3,283,871.—*Paul E. Becking*, Lake Orion, *James D. Bungard*, East Detroit, and *Roy E. Sherman*, Warren, Mich. WRITING SYSTEM HAVING ORDINATE AND ABSCISSA READER MEANS. Patent dated Nov. 8, 1966. Disclaimer filed Jan. 27, 1969, by the assignee, *Intercontinental Systems, Inc.*

Hereby enters this disclaimer to claims 1, 2, 3, 7, 9, 11, 12, 13, 14, 15, 16, 17, 18, 19, 20, 21, and 27 of said patent.

[*Official Gazette March 4, 1969.*]